United States Patent
Straub et al.

(10) Patent No.: US 9,789,863 B2
(45) Date of Patent: Oct. 17, 2017

(54) METHOD AND SYSTEM FOR CONTROLLING A MOTOR VEHICLE PARKING BRAKE DURING A STOP

(75) Inventors: Thomas Straub, Vallendar (DE); Leo Gilles, Koblenz (DE); Ralf Leiter, Mendig (DE)

(73) Assignee: Lucas Automotive GmbH, Koblenz (DE)

( * ) Notice: Subject to any disclaimer, the term of this patent is extended or adjusted under 35 U.S.C. 154(b) by 1656 days.

(21) Appl. No.: 11/921,344

(22) PCT Filed: May 26, 2006

(86) PCT No.: PCT/EP2006/005081
§ 371 (c)(1),
(2), (4) Date: May 19, 2009

(87) PCT Pub. No.: WO2006/128651
PCT Pub. Date: Dec. 7, 2006

(65) Prior Publication Data
US 2009/0305848 A1    Dec. 10, 2009

(30) Foreign Application Priority Data
May 31, 2005    (DE) .................. 10 2005 024 834

(51) Int. Cl.
*B60T 8/32*    (2006.01)
*B60T 13/74*    (2006.01)
*B60T 7/10*    (2006.01)

(52) U.S. Cl.
CPC ............ *B60T 13/746* (2013.01); *B60T 7/107* (2013.01); *Y10T 477/813* (2015.01)

(58) Field of Classification Search
CPC ........... B60T 2201/06; B60T 7/12; B60T 8/17
(Continued)

(56) References Cited

U.S. PATENT DOCUMENTS 4,561,527 A * 12/1985 Nakamoto et al. ........ 192/219.4
4,629,043 A    12/1986 Matsuo et al.
(Continued)

FOREIGN PATENT DOCUMENTS

DE    41 29 919 A1    3/1993
DE    198 36 687 A1    8/1999
(Continued)

OTHER PUBLICATIONS

See a machine translation of DE 19849799.*

*Primary Examiner* — Anna Momper
*Assistant Examiner* — Mahbubur Rashid
(74) *Attorney, Agent, or Firm* — MacMillan, Sobanski & Todd, LLC

(57) ABSTRACT

A method and a system for controlling a parking brake of a motor vehicle are described. According to the described method, an ignition signal and an actuation state of the parking brake are detected. An application force of the parking brake is then set to a first value in dependence upon the actuation state of the parking brake if the ignition signal is present. If the parking brake was previously in an applied actuation state, the application force is reduced from a second value to the first value. If the parking brake was previously in a released actuation state, the application force is increased to the first value. The first value is sufficient to hold the motor vehicle in its current position.

16 Claims, 3 Drawing Sheets

(58) Field of Classification Search
USPC .......................................... 303/191, 192, 156
See application file for complete search history.

(56) References Cited

U.S. PATENT DOCUMENTS

| | | | | |
|---|---|---|---|---|
| 5,984,429 | A * | 11/1999 | Nell et al. ................... | 303/113.4 |
| 6,139,117 | A * | 10/2000 | Shirai et al. .................. | 303/3 |
| 6,702,405 | B1 * | 3/2004 | Balz et al. ..................... | 303/192 |
| 7,140,697 | B2 * | 11/2006 | Koga ........................ | B60T 7/107 |
| | | | | 188/156 |
| 2002/0066626 | A1 * | 6/2002 | Gill et al. ..................... | 188/158 |
| 2003/0214185 | A1 * | 11/2003 | Kinder et al. ................. | 303/192 |
| 2004/0011610 | A1 * | 1/2004 | Witzler et al. ................ | 188/265 |
| 2004/0017106 | A1 * | 1/2004 | Aizawa et al. ............... | 303/191 |
| 2004/0113489 | A1 * | 6/2004 | Iwagawa et al. ............. | 303/155 |
| 2004/0212247 | A1 * | 10/2004 | Endres ........................ | 303/113.4 |
| 2006/0131957 | A1 * | 6/2006 | Kinder et al. ................. | 303/191 |
| 2007/0029876 | A1 * | 2/2007 | Makishima et al. .......... | 303/191 |
| 2008/0053761 | A1 * | 3/2008 | Yamamoto .................... | 188/156 |
| 2008/0262687 | A1 * | 10/2008 | Fujita et al. .................. | 701/70 |

FOREIGN PATENT DOCUMENTS

| | | | | |
|---|---|---|---|---|
| DE | 198 49 799 | A1 | 6/2000 | |
| EP | 1849667 | A1 * | 10/2007 | |
| FR | 2850911 | A1 * | 8/2004 | ............. B60T 7/107 |
| FR | WO 2004071826 | A3 * | 9/2004 | ............. B60T 7/107 |
| GB | 2311345 | A * | 9/1997 | |

* cited by examiner

METHOD AND SYSTEM FOR CONTROLLING A MOTOR VEHICLE PARKING BRAKE DURING A STOP

CROSS-REFERENCE TO RELATED APPLICATIONS

This application is a national stage of International Application No. PCT/EP2006/005081 filed May 26, 2006, the disclosures of which are incorporated herein by reference in entirety, and which claimed priority to German Patent Application No. 10 2005 024 834.9 filed May 31, 2005, the disclosures of which are incorporated herein by reference in entirety.

BACKGROUND OF THE INVENTION

The invention relates to a method and a system for controlling a parking brake of a motor vehicle during a stop.

For increased comfort in motor vehicles it is known for the parking brake (also known as the emergency brake) to be electrically actuated. The parking brake is for example automatically activated, i.e. applied, as soon as the vehicle is in the stationary state and automatically deactivated, i.e. released, as soon as a drive away (or starting) operation of the vehicle is requested or detected. In the case of automatic activation of the parking brake, the parking brake is conventionally applied at a maximum value in order thereby to guarantee a reliably stationary state of the vehicle.

In the case of automatic release of the parking brake (for example as a reaction to a requested drive away operation), there is however the problem that, because of the delay that occurs between detection of the drive away operation and full release of the parking brake, the parking brake cannot be fully released quickly enough, with the result that an unimpeded drive away operation is often not possible. The driver then experiences for example a jolt.

BRIEF SUMMARY OF THE INVENTION

It is a feature of the invention is to provide a method and a system for controlling a vehicle equipped with a parking brake that allow a comfortable drive away operation.

According to the invention, the application force of the parking brake is set to a first value in dependence upon the actuation state of the parking brake and the presence of an ignition signal, wherein the first value is lower than a second value set during parking of the vehicle but is sufficient to hold the motor vehicle in a current position. In this case, the application force may be reduced from the second value to the first value if the parking brake is in the applied actuation state. The application force may however also be increased to the first value if the parking brake is in the released actuation state. The first and the second value may also lie within a first and second range of values respectively.

The first value is lower than the second value (wherein both the first and the second value may be selected dynamically in dependence upon a road gradient). The time it takes to release the parking brake may therefore be reduced compared to a parking brake applied to the second value (e.g. a maximum value), thereby enabling a more comfortable and faster driveaway operation. As the parking brake is not always acted upon by the maximum application force, the load profile of the parking brake is moreover optimized. As a result of this optimization, the load of the parking brake drops and less wear occurs at the parking brake. This leads to a lengthening of the maintenance intervals and to an increase of the useful life of the parking brake.

This approach may be realized using various detection devices. For example, the ignition signal, i.e. is the ignition switched on ("ON") or off ("OFF"), may be evaluated in order to differentiate between holding or stopping of the vehicle and parking of the vehicle. Here, by holding or stopping is meant a brief halt of the vehicle at traffic lights, a crossing etc. By parking of the vehicle is meant the definitive process of parking (and often leaving of the vehicle by the driver). Definitive parking may be assumed for example also when the ignition is switched off or the driver manually requests an actuation of the parking brake. Provided it is not yet ascertained whether the vehicle is definitively parked, a holding or stopping operation may be assumed.

The actuation state of the parking brake may further be detected by means of a suitable device. In this case, the actuation state of the parking brake may vary between fully released and fully applied, i.e. the application force of the parking brake may have a value between zero (released) and fully applied. However, all of the intermediate values (such as for example 30, 50 or 70% applied) are also possible.

In a development, the application force may be increased from the first value to the second value if the ignition signal is no longer present ("OFF"). By increasing the application force to the second value it is ensured that the parking brake is acted upon by a higher (for example maximum) application force when the vehicle is to be definitively parked. In an additional or alternative manner it is possible to set the application force of the parking brake to the second value if the bonnet (i.e., hood), the luggage boot (i.e., trunk), or a vehicle door is opened.

A signal corresponding to a driver request to close (apply) the parking brake may further be detected. If this signal is present, the application force of the parking brake may be increased to the first or second value depending on the actual actuation state (and optionally further parameters). The signal may be generated by actuating a lever or button situated within reach of the driver.

A further construction consists of setting the application force of the parking brake in dependence upon a signal that provides information about the presence of the driver. In this case, the application force of the parking brake may be increased to the second value if the corresponding signal is not (or no longer) present, i.e. if the driver is not inside the vehicle (possibly even while the ignition is switched on). It is further conceivable, upon detection of a driver presence signal, to increase the application force (for example from the first to the second value or, in the released state of the parking brake, to the first or the second value) when it is necessary to prevent or stop the vehicle accidentally rolling away. The driver presence signal may be generated by a seat occupation detection device that detects the presence of the driver by means of an interior camera, weight sensors and/or sensors that detect the fastening of the driver's seatbelt.

Preferably, in the method and/or system according to the invention at least one further vehicle state parameter is detected. This parameter may be provided by means of an inclination sensor, a rollback sensor and/or other suitable signals from an electronic control unit (ECU). Based on this parameter, the first value of the application force of the parking brake may be (for example inclination-dependently) set in a way that ensures that the motor vehicle is held in a current position.

In a possible construction, the first value is 5 to 13 kN, in particular 7 to 11 kN (for example 9 kN), and the second value is 13 to 21 kN, in particular 15 to 19 kN (for example 17 kN). It is however also possible to assign other amounts to the first and/or second value provided it is guaranteed that there is always a safe application force at the parking brake. The first value may moreover be so dimensioned that it is just enough ("minimum value") to hold the vehicle in the current position.

The method and/or system according to the invention may be used with an electric parking brake (EPB), a hydraulic parking brake (HPB), an electromechanical brake (EMB) or an electromechanical parking brake (EMF).

In the case of the HPB, the first value for the application force of the parking brake may be achieved in that on the flat or in the case of slight gradients (of, say, up to 15%) only the actuators are electrically closed without any intervention by the hydraulic brake application assistance. For faster release of the HPB, therefore, only the actuators have to be released without there being any need to reduce a hydraulic pressure.

The parking brake control intervention according to the invention may relate to one, several or all of the wheel brakes of a motor vehicle. It is also possible to define individual groups of wheel brakes, to which the control intervention relates. For example, the wheel brakes of a particular side (left motor vehicle side/right motor vehicle side) may be opened or closed.

It is further possible to provide a driver warning device that alerts the driver to a control intervention. The driver warning device may bring the intervention to the attention of the driver optically, acoustically and/or haptically.

Other advantages of this invention will become apparent to those skilled in the art from the following detailed description of the preferred embodiments, when read in light of the accompanying drawings.

DETAILED DESCRIPTION OF THE INVENTION

Figure 1:
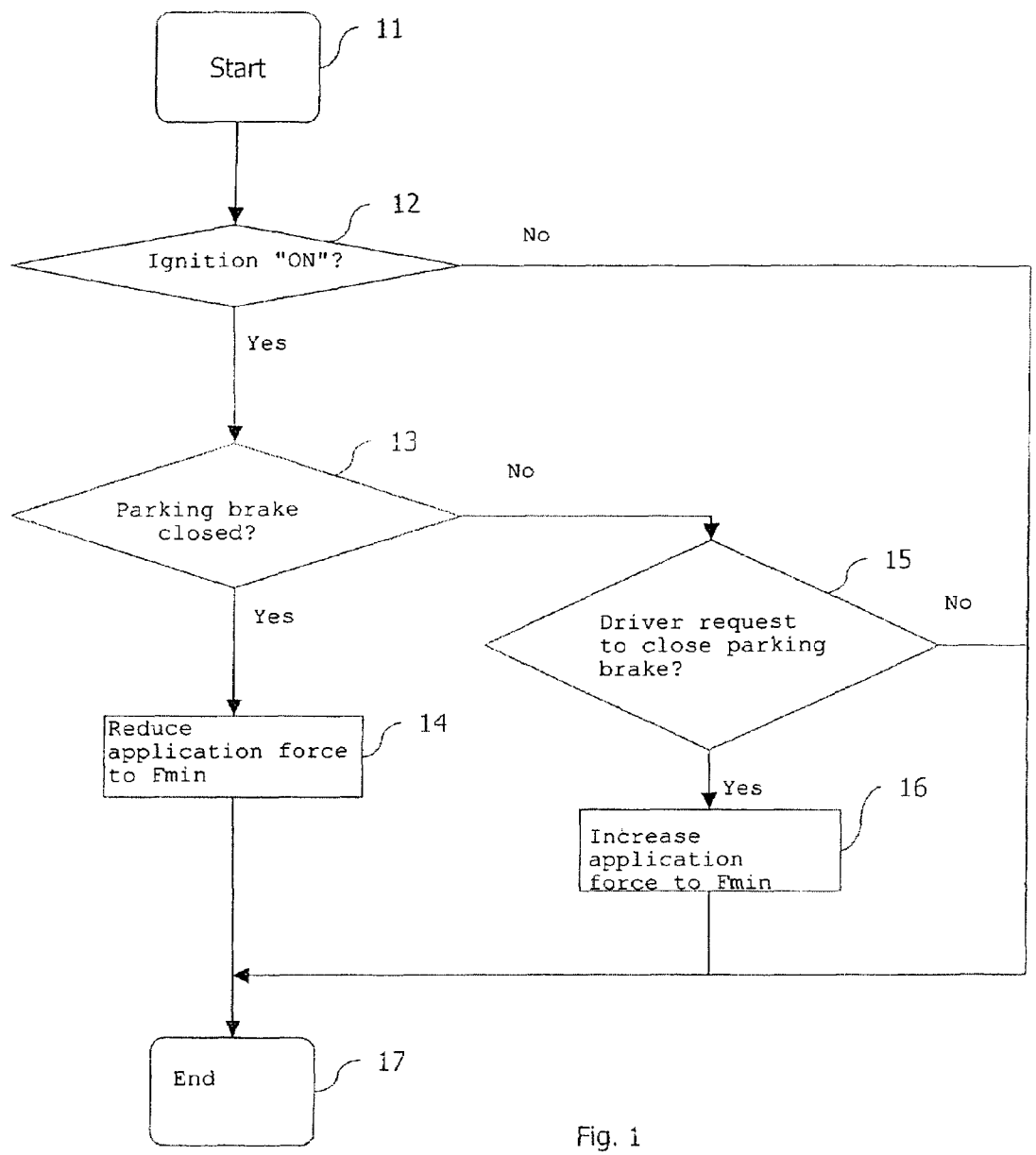
FIG. 1 shows a flowchart of a first embodiment of the method according to the invention of controlling a parking brake.

The flowchart represented in FIG. 1 diagrammatically illustrates the steps of a method of controlling an electric parking brake according to a first embodiment.

In a first method step 12 the existence of an ignition signal is detected by means of a suitable sensor such as for example an ignition signal sensor or the like. In a second method step 13 it is checked whether the parking brake is closed (for example whether the parking brake is applied by its maximum value or within a specific maximum value range). This may be established at the actuators of the parking brake by means of a force sensor or a displacement sensor or by means of an engine current increase gradient, spindle displacement determination, the current consumption or the like.

If it is established in step 13 that the parking brake is closed, in the next method step 14 the application force of the parking brake is reduced to a (possibly inclination-dependent) minimum value and held at this value. This means that the actuators are opened far enough for the application force of the parking brake to be sufficient to hold the vehicle precisely in its current position.

If, on the other hand, it is established in step 13 that the parking brake is open, it is checked in method step 15 whether the driver request (or a driver-independent system requirement) to close the parking brake exists. If this is not the case, the parking brake remains open and the method is terminated. If, on the other hand; it is determined in step 15 that the parking brake is to be closed, the application force of the parking brake is increased to the minimum value and held at this value.

Figure 2:
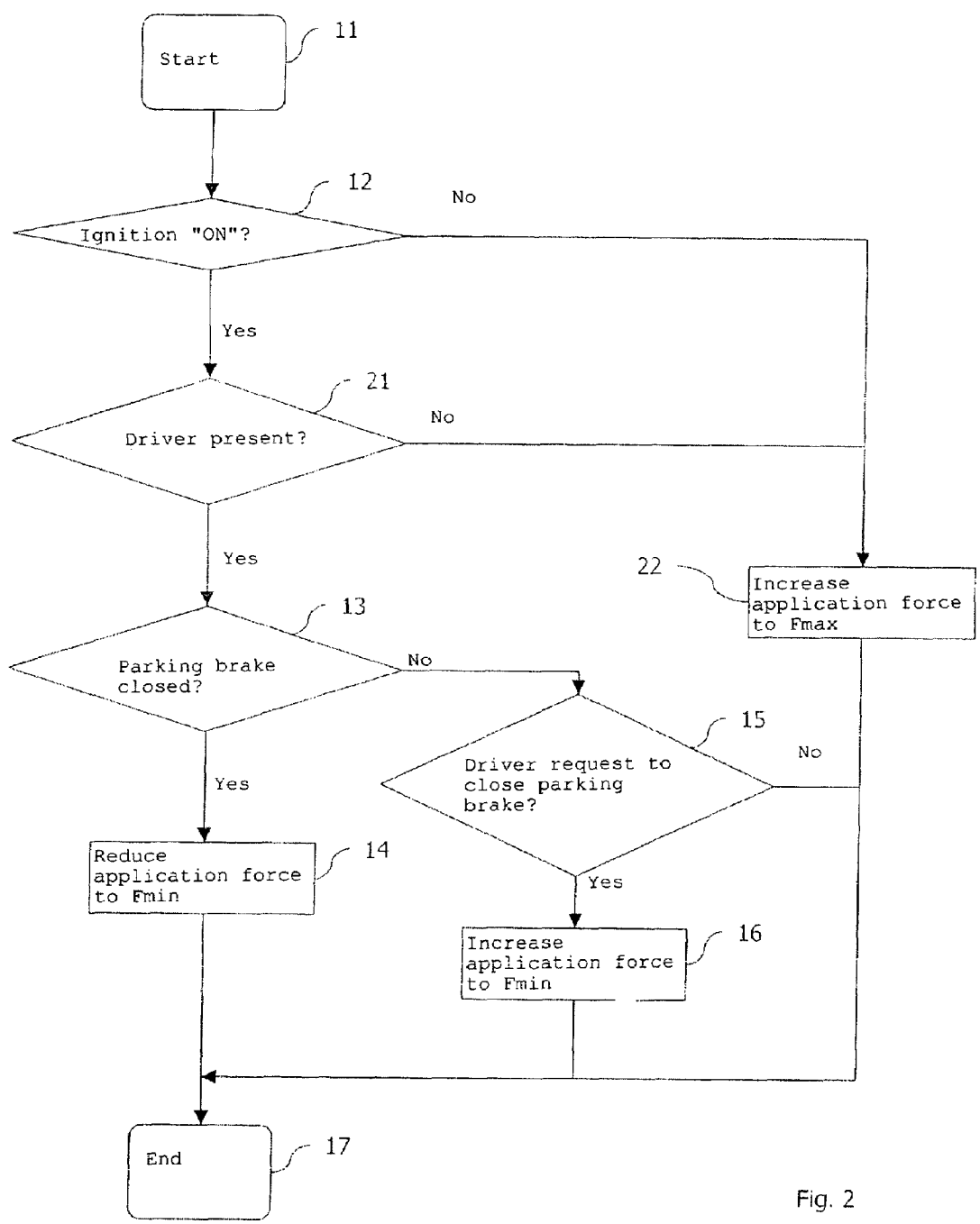
FIG. 2 shows a flowchart of a further embodiment of the method according to the invention of controlling a parking brake.

FIG. 2 shows a flowchart that illustrates a second embodiment of a method according to the invention of controlling an electric parking brake. Here, similar reference numerals denote the same method steps as in the first embodiment.

The second embodiment differs from the embodiment represented in FIG. 1 in that after step 12 in the method step 21 the presence of the driver is detected. The detection of the driver's presence may be detected by means of an interior camera, by means of seat occupation sensors in the driver seat or the like. If the driver is present in the vehicle, the method continues with step 13. If the driver is not in the vehicle but the ignition is switched on, in a method step 22 the application force of the parking brake is increased to a maximum value and held at this value. In other words, the actuators of the parking brake are closed far enough for the application force of the parking brake to ensure that the vehicle reliably remains in its current position even for extended stationary periods. In this case, the maximum value may also be set or re-adjusted in dependence upon the vehicle inclination.

In step 21 in an alternative manner an open luggage boot, an open bonnet and/or an open vehicle door may also be detected. The occurrence of one of these conditions leads likewise in step 22 to the application force of the parking brake being increased to a maximum value and held at this value.

In a development of the embodiments illustrated in FIGS. 1 and 2, in the absence of a driver request to "close the parking brake" step 15 detects (for example in a non-recurring or continuous manner) whether the vehicle is rolling away or is threatening to roll away. Rolling-away of the vehicle may be detected by means of a wheel sensor, while imminent rolling-away is detectable for example by means of an inclination sensor or similar sensing equipment. If actual or imminent rolling-away is detected, the application force of the parking brake is increased, i.e. is set to at least the minimum value and preferably to the maximum value. This safety mechanism intervenes for example if the driver goes to sleep in the vehicle with the parking brake not closed. To back up the safety mechanism, an audible alarm signal may be supplied by a warning device. The warning device may optionally also be activated in one or more of the steps 14, 16 and 22.

Figure 3:
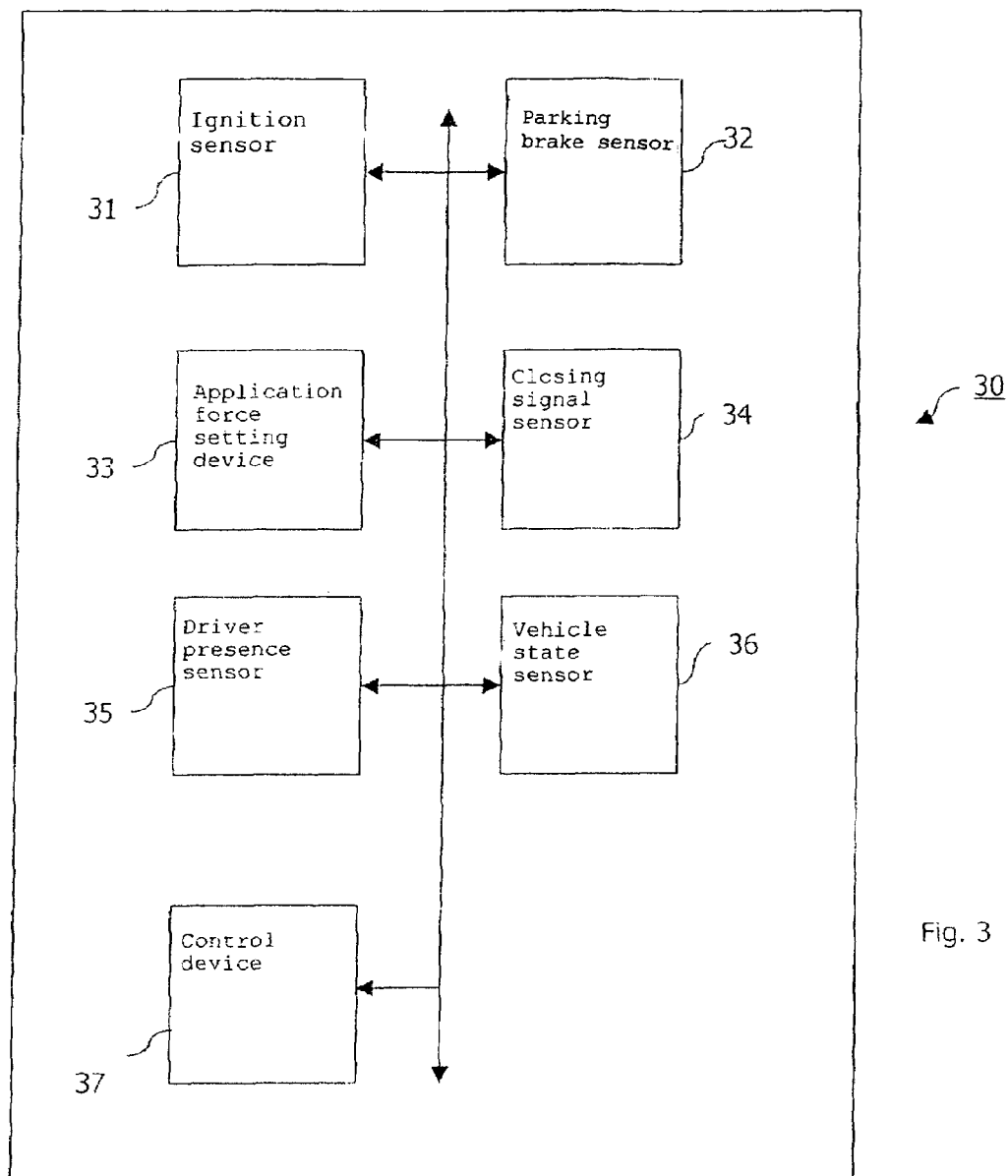
FIG. 3 shows a block diagram of the system according to the invention for controlling a parking brake.

FIG. 3 shows a block diagram of an embodiment of the parking brake according to the invention. Here, reference numeral 30 denotes the entire system, such as may be used in a vehicle or may be implemented in an electronic control unit (not shown). An ignition sensor 31 detects whether an ignition signal exists. In this case, the ignition may present the states "ON" and "OFF". A parking brake sensor 32 detects an actuation state of the parking brake. The parking brake may be released (open) or applied (closed). It is however also possible for the parking brake to be partially, for example 30, 50 or 70% applied. An application force setting device 33 sets the application force of the parking brake in accordance with the method described with reference to FIGS. 1 and 2. The application force setting is controlled in the present case by a control device 32.

A closing signal sensor 34 determines whether the driver wishes to actuate the parking brake. The closing signal sensor 34 may in this case be actuated via a lever or button situated within reach of the driver. A driver presence sensor 35 produces a signal in dependence upon the presence of the driver. At least one vehicle state sensor 36 may further be provided. The vehicle state sensor 36 in this case may comprise an inclination sensor, rollback sensor, wheel sensor or the like. The vehicle state sensor 36 may moreover also be connected to the sensors of possible drive assist devices (for example ABS, EPS, ACC etc.). The output signals of the sensors may be input either directly into the application force setting device 33 or into the electronic control device 37 and be further processed there.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of controlling a parking brake of a motor vehicle during a stop, comprising the following steps:
   detecting an ignition signal;
   detecting an actuation state of the parking brake during the stop, wherein the actuation state of the parking brake is one of an applied actuation state in which the parking brake is applied and a released actuation state in which the parking brake is released; and
   setting an application force of the parking brake to a first value in dependence upon the actuation state of the parking brake when the ignition signal is present and the vehicle is stopped but not parked,
   setting the application force of the parking brake to a second value when the vehicle is parked, wherein the application force is increased from the first value to the second value when the ignition signal is no longer present,
   wherein the first value is lower than the second value, the first value being set to be sufficient to hold the motor vehicle in a current position, and
   detecting a signal corresponding to a driver request to close the parking brake, wherein if the signal corresponding to the driver request is present, the application force of the parking brake is increased to the first value or the second value depending on the actual actuation state of the parking brake and/or when the ignition signal changes from an absent state to a present state, reducing the application force in the applied actuation state of the parking brake from the second value to the first value solely by an electronic control device, such that the application force of the parking brake is changed from the second value to the first value smaller than the second value and the first value being set to be sufficient to hold the motor vehicle in the current position.

2. The method according to claim 1, including the step: detecting a signal to close the parking brake, wherein the application force is increased to the first value if the closing signal is present.

3. The method according to claim 1, including the step: detecting a driver presence signal, wherein the application force is set in dependence upon the driver presence signal.

4. The method according to claim 3, wherein the application force is set to the second value if the driver presence signal is not present.

5. The method according to claim 3, wherein the application force is increased and in particular set to the first or the second value if in the released actuation state of the parking brake the driver presence signal is present and rolling-away or imminent rolling-away of the vehicle is detected.

6. The method according to claim 1, including the step: detecting at least one vehicle state parameter, in particular the road gradient, wherein the application force is set in dependence upon the vehicle state parameter.

7. The method according to claim 1, wherein the first value is 5 to 13 kN.

8. The method according to claim 1, wherein the second value is 13 to 21 kN.

9. The method according to claim 1, wherein the first value is a minimum value, just sufficient to hold the vehicle in the current position.

10. The method according to claim 7, wherein the first value is 7 to 11 kN.

11. The method according to claim 8, wherein the second value is 15 to 19 kN.

12. A system for controlling a parking brake of a motor vehicle during a stop, comprising an ignition sensor for detecting an ignition signal, a parking brake sensor for detecting an actuation state of the parking brake during a stop, wherein the actuation state of the parking brake is one of an applied actuation state in which the parking brake is applied and a released actuation state in which the parking brake is released, an application force setting device for setting an application force of the parking brake to a first value in dependence upon the actuation state of the parking brake when the ignition signal is present and the vehicle is stopped but not parked, setting the application force of the parking brake to a second value when the vehicle is parked, wherein the application force is increased from the first value to the second value when the ignition signal is no longer present, wherein the first value is lower than the second value, the first value being set to be sufficient to hold the vehicle in a current position, and an electronic control device that detects a signal corresponding to a driver request to close the parking brake, wherein if the signal corresponding to the driver request is present, the application force of the parking brake is increased to the first value or the second value depending on the actual actuation state of the parking brake and/or when the ignition signal changes from an absent state to a present state, and reduces the application force in the applied actuation state of the parking brake from the second value to the first value solely by an electronic control device, such that the application force of the parking brake is changed from the second value to the first value smaller than the second value and the first value being set to be sufficient to hold the motor vehicle in the current position.

13. The system according to claim 12, comprising a closing signal sensor for detecting a signal to close the parking brake, wherein the application force setting device sets the application force in dependence upon the closing signal.

14. The system according to claim 12, comprising a driver presence sensor for detecting the presence of a driver, wherein the application force setting device sets the application force in dependence upon the presence of the driver.

15. The system according to claim 12, comprising at least one vehicle state sensor for detecting at least one further vehicle state parameter, wherein the application force setting device sets the application force in dependence upon the further vehicle state parameter.

16. The system according to claim 15, characterized in that the vehicle state sensor is an inclination sensor.

* * * * *